United States Patent [19]

Washington

[11] Patent Number: 5,686,765
[45] Date of Patent: *Nov. 11, 1997

[54] VEHICLE SECURITY SYSTEM INCLUDING FINGERPRINT AND EYEBALL PART IDENTIFICATION

[75] Inventor: Valdemar L. Washington, Flint, Mich.

[73] Assignee: Driver ID LLC, Flint, Mich.

[*] Notice: The term of this patent shall not extend beyond the expiration date of Pat. No. 5,519,260.

[21] Appl. No.: 668,126

[22] Filed: Jun. 21, 1996

Related U.S. Application Data

[63] Continuation-in-part of Ser. No. 644,130, May 10, 1996, abandoned, which is a continuation-in-part of Ser. No. 201,929, Feb. 24, 1994, Pat. No. 5,519,260, which is a continuation-in-part of Ser. No. 33,753, Mar. 19, 1993, abandoned.

[51] Int. Cl.$^6$ ............................................. B60R 25/04
[52] U.S. Cl. .................... 307/10.5; 180/287; 340/825.69
[58] Field of Search ........................... 307/10.1–10.6; 382/116, 117, 124; 180/287; 340/425.5, 426, 825.3–825.32, 825.34, 825.54, 825.69, 825.72; 235/380, 382, 382.5, 493; 364/423.098, 424.037, 424.045

[56] References Cited

U.S. PATENT DOCUMENTS

| | | | |
|---|---|---|---|
| 3,665,397 | 5/1972 | Di Napoli et al. | 340/825.33 |
| 4,067,411 | 1/1978 | Conley et al. | 307/10.2 |
| 4,177,466 | 12/1979 | Reagan . | |
| 4,463,340 | 7/1984 | Adkins et al. | 180/287 |
| 4,553,511 | 11/1985 | Hayakawa et al. | 180/287 |
| 4,777,377 | 10/1988 | Jeter | 307/10.2 |
| 4,804,937 | 2/1989 | Barbiaux et al. | 340/425.5 |
| 4,805,722 | 2/1989 | Keating et al. | 180/287 |
| 4,926,332 | 5/1990 | Komuro et al. | 340/825.69 |
| 4,982,072 | 1/1991 | Takigami | 307/10.4 |
| 4,990,890 | 2/1991 | Newby | 340/426 |
| 4,993,068 | 2/1991 | Poisenka et al. | 235/380 |
| 4,995,086 | 2/1991 | Lilley et al. | 235/380 |
| 5,023,605 | 6/1991 | McColl | 340/825.31 |
| 5,089,762 | 2/1992 | Sloan | 307/10.7 |
| 5,124,920 | 6/1992 | Tamada et al. | 364/424.05 |
| 5,307,048 | 4/1994 | Sonders | 340/426 |
| 5,396,215 | 3/1995 | Hinkle | 340/426 |
| 5,519,260 | 5/1996 | Washington | 307/10.5 |
| 5,583,486 | 12/1996 | Kersten | 180/287 |

*Primary Examiner*—Richard T. Elms
*Attorney, Agent, or Firm*—Gifford, Krass, Groh, Sprinkle, Patmore, Anderson & Citkowski, P.C.

[57] ABSTRACT

A system is provided for use with an automotive vehicle having a normally disabled ignition system. The system includes a reader, such as a fingerprint reader or retina reader, to identify the driver. The output from the reader is compared to corresponding physiological data stored in memory to determine if the driver is authorized to operate the vehicle. Optionally, a timer is employed to permit operation of the vehicle only during preset prescribed time periods.

28 Claims, 3 Drawing Sheets

VEHICLE SECURITY SYSTEM INCLUDING FINGERPRINT AND EYEBALL PART IDENTIFICATION

CROSS REFERENCE TO RELATED APPLICATIONS

This application is a continuation-in-part of U.S. patent application Ser. No. 08/644,130 filed May 10, 1996 now abandoned, which is a continuation-in-part of U.S. patent application Ser. No. 08/201,929 filed Feb. 24, 1994 (now U.S. Pat. No. 5,519,260), which is a continuation-in-part of Ser. No. 08/033,753 filed Mar. 19, 1993, entitled VEHICLE SECURITY SYSTEM, now abandoned.

BACKGROUND OF THE INVENTION

I. Field of the Invention

The present invention relates generally to a security system for an automotive vehicle.

II. Description of the Prior Art

Virtually all automotive vehicles utilize an ignition key to activate or enable the ignition system. Since any person is capable of inserting the ignition key into the ignition slot and activating the ignition system, the vehicle can be operated not only by people not authorized to drive that particular vehicle, but also by persons who are not authorized to drive at all.

All states in the United States issue driver's licenses to authorized drivers. Furthermore, this driver's license can be revoked and physically removed from the driver for a number of different reasons. For example, drivers who exceed a certain number of traffic violations within a certain time frame, such as a year, may have their driver's license revoked. Similarly, drivers that have been convicted of drunk driving or who refuse to take drunk driving tests when stopped by the police have their driver's license revoked. Such revocation involves the physical removal of the driver's license from the driver.

Unfortunately, many drivers continue to drive despite revocation of their driver's license. Since these drivers represent the potentially more dangerous drivers due to their traffic violations, such unauthorized drivers cause a disproportionately high number of accidents and traffic fatalities. Elimination of such unauthorized drivers in driving vehicles would therefore be highly advantageous in reducing traffic accidents, fatalities and other traffic violations.

In many cases, drivers who have had their license revoked can receive a restricted license which permits the driver to drive to and from work. Many of these drivers, however, use the restricted license to drive outside their normal working hours.

SUMMARY OF THE PRESENT INVENTION

The present invention provides a system which prevents unauthorized drivers from driving automotive vehicles.

In brief, in the system of the present invention, each driver's license is encoded with the identity of the driver. Preferably, this encoding comprises a magnetic strip formed along one side of the driver's license.

The automotive vehicle is equipped with a reader capable of reading the encoded information on the driver's license and transmitting the encoded information to a microprocessor contained in the vehicle. This microprocessor has access to computer memory in which the identification of authorized driver(s) for the vehicle are stored. Such programming of the computer memory can be performed by an automotive dealer or the like. Furthermore, a key pad is provided to receive a personal identification number (PIN) for the driver to prevent the use of stolen driver licenses.

In the event that the driver's license identification signal matches with an authorized driver for the vehicle, the microprocessor generates an output signal which enables the ignition system for the vehicle. The vehicle can then be operated in the normal fashion.

Conversely, if the driver's license identification signal does not match one of the pre-stored authorized drivers in the computer memory, the microprocessor activates a radio transmitter which transmits the driver's identification signal by radio to a central station. The central station then compares the received driver's identification signal with a list of all authorized drivers. If the driver's identification received from the vehicle matches a stored identification at the central station, the central station then transmits a radio signal to the vehicle which is received by a radio receiver at the vehicle. Upon receipt of the authorization signal from the central station, the microprocessor generates the appropriate output signals to enable the vehicle ignition system. Otherwise, the ignition system for the vehicle remains disabled.

Consequently, as will be hereinafter described in greater detail, the present system allows only persons who have a valid driver license to operate the automotive vehicle.

In an alternative embodiment of the invention, a timer circuit is used to disable the vehicle ignition outside of normal working hours for the driver. Such a timer circuit would be used when a driver is issued a restricted license.

In still a further alternative embodiment of the invention, a person having a restricted license is required to wear a radio transmitter which generates a preset radio signal. Such transmitters are conventionally contained in an ankle bracelet and are commonly known as an electronic tether system.

The vehicle then contains a radio receiver for receiving the preset signal from the ankle bracelet. Upon receipt of the preset signal by the receiver the receiver generates an output signal indicative that a person wearing the ankle bracelet is present in the car. Preferably, the radio receiver is positioned under the floor mat on the drivers side of the vehicle.

Upon receipt of the signal from the receiver, a microprocessor compares a time signal from a clock with a preset time schedule containing time periods during which operation of the vehicle by persons wearing the ankle bracelet is unauthorized. In the event that the time signal from the clock is within the preset time schedule, indicative that operation of the vehicle is unauthorized, the microprocessor generates an output signal which disables the vehicle. Otherwise, normal operation of the vehicle is allowed.

Additionally, the time of operation of the vehicle is preferably recorded in random access memory which can be down loaded to a computer through an output port on the vehicle. Such information can be then periodically checked by the authorities.

In an alternate embodiment a fingerprint reader, retinal scanner or other physiological identification means is used to selectively activate the ignition system.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
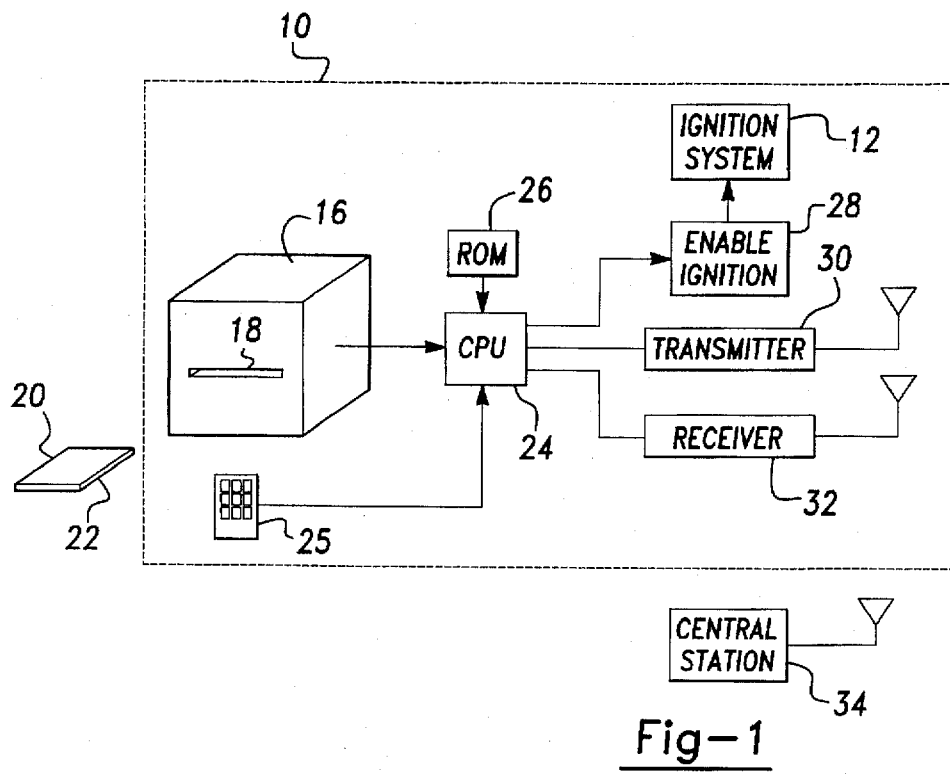
FIG. 1 is a block diagrammatic view illustrating a preferred embodiment of the present invention.

With reference first to FIG. 1, an automotive vehicle 10 (illustrated only diagrammatically) is there shown having an ignition system 12. The vehicle 10, as well as the ignition system 12 are of any conventional construction. Furthermore, the system 14 of the present invention, which will subsequently be described in greater detail, may be either installed as original factory equipment or in the secondary market.

The system 14 includes a card reader 16 having a slot 18 for receiving a driver's license 20. The driver's license 20 has a magnetic strip 22 contained on one side of the driver's license 20 and this magnetic strip is encoded with information representative of the identity of the person having the driver's license 20. The magnetic strip is also encoded with a personal identification number (PIN) for the driver.

Upon insertion of the driver's license 20 into the card reader slot 18, the card reader 16 reads the magnetic strip 22 and transmits the information from the magnetic strip 22 to a central processing unit 24. The driver then enters his or her PIN to the microprocessor 24 with a key pad 25. The central processing unit (CPU) 24 is preferably a microprocessor and may be the same microprocessor commonly found in modern vehicles. Such microprocessors control, for example, engine ignition, engine emission controls and the like.

In the event that an improper PIN is entered after a predetermined number of tries, e.g. three attempts, the CPU 24 generates output signals to disable the ignition system 12 and prevent operation of the vehicle.

The central processing unit 24 has access to Read Only Memory (ROM) 26 which contains, inter alia, stored data representative of the authorized drivers for the particular vehicle 10. Such information is stored in the read only memory 26 by the automotive dealer or the like. Preferably, the memory 26 can be reprogrammed by the automotive dealer as different authorized drivers for the vehicle are added or deleted.

Still referring to FIG. 1, the central processing unit 24 provides an output line to a circuit means 28 which in turn is used to enable, or disable, the ignition system 12. Any conventional means can be used to enable the ignition system, such as ungrounding or grounding the ignition coil.

The central processing unit 24 also has an output control line to a transmitter 30 and an input control line from a receiver 32. Both the transmitter 30 and receiver 32 operate through radio waves in conjunction with a central station 34 in a manner which will subsequently be described.

Figure 2:
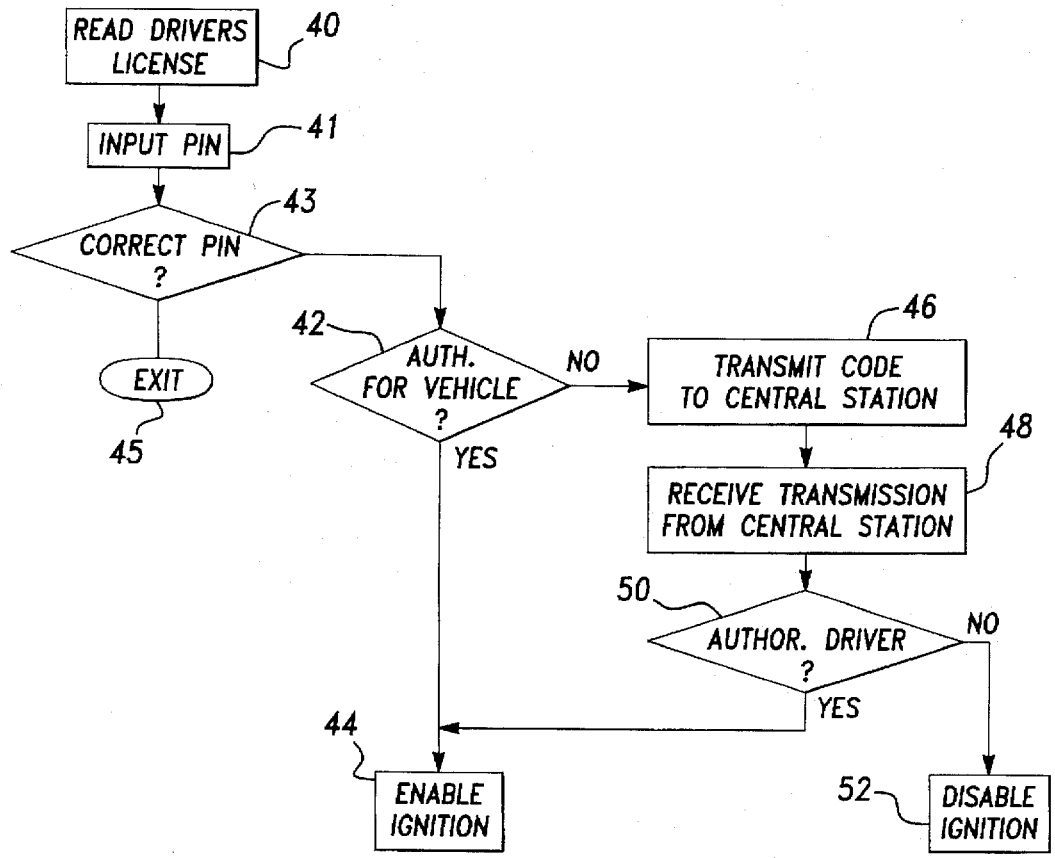
FIG. 2 is a flow chart illustrating a computer program for the preferred embodiment of the present invention.

With reference now to FIG. 2, the operation of the system 14 of the present invention will now be described in detail.

Assuming that the ignition system 12 is normally disabled, and the driver's license 20 inserted into the card reader 16, step 40 first reads the information from the magnetic strip 22 on the driver's license 20. Step 40 then branches to step 41 and inputs the driver's PIN via the key pad 25. Step 41 then branches to step 43.

At step 43, the entered PIN is compared with the encoded PIN on the driver's license . If the PINs do not match, step 43 exits to step 45 thus leaving the ignition disabled. If the PINs match, step 43 branches to step 42.

At step 42, the central processing unit 24 compares the information read from the driver's license with the information stored in the read only memory 26 to determine if the driver's license is an authorized user of the vehicle 10. If so, step 42 branches to step 44 at which the central processing unit 24 generates an output signal to the circuit means 28 to enable the ignition system 12 and allow normal operation of the car.

Assuming that the driver is not authorized, step 42 instead branches to step 46. At step 46, the central processing unit transmits the information read from the driver's license via the radio transmitter 30 to the central station 34. Step 46 then branches to step 48.

The central station 34 has access to computer memory which contains a list of all authorized drivers. Upon receipt of a radio signal from the vehicle transmitter 30, the central station 34 processes the received information by comparing the received signal with its list of authorized drivers. After completing this comparison, the central station 34 transmits a coded radio signal back to the vehicle indicative of whether or not the driver's license belongs to an authorized driver.

At step 48, the microprocessor receives a signal from the central station 34 via the radio receiver 32 indicative of whether or not the driver's license is a valid driver's license . Step 48 then branches to step 50 where the central processing unit processes the signal received from the central station 34. If the driver's license is authorized, step 50 branches to step 44 which enables the ignition system 12 and permits normal operation of the vehicle. Otherwise, step 50 branches to step 52 which continues to disable the ignition system 12 and prevent operation of the vehicle.

From the foregoing, it can be seen that the present invention provides a simple and highly effective means for prohibiting use of an automotive vehicle except by persons having a valid driver's license . Furthermore, since most uses of automotive vehicles are by a limited number of authorized users of the vehicle which can be easily stored in the vehicle computer memory 26, the necessity to transmit the driver's license information through the transmitter 30 and to receive a signal from the central station through the receiver 32 occurs in only a small number of cases. Thus, the central station can accommodate a large number of automotive vehicles 10 and still remain economical.

The system of the present invention can also be adapted to detect tampering with the system 10 and, in such an event, disabling of the vehicle ignition system by the central station 34 and/or internally via the CPU 24.

Figure 3:
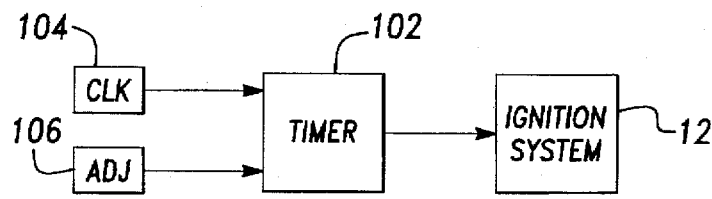
FIG. 3 is a diagrammatic view illustrating a second preferred embodiment of the invention.

With reference now to FIG. 3, an alternate embodiment 100 of the invention is there shown. The alternate embodiment 100 will be issued to drivers with restricted licenses to prevent operation of the vehicle outside of normal working hours for the driver with the restricted license.

In FIG. 3, a timer circuit 102 is operatively connected with the vehicle ignition system 12. The timer circuit 102 receives a signal from a clock 104 and disables the ignition system 12 at all times outside the normal or authorized working hours (including travel time) of the driver. Any conventional means, such as grounding the ignition coil, can be used to disable the ignition system. An adjustment circuit 106 allows adjustment of the timer circuit 102 to accommodate different working schedules.

Since the timer circuit 102 disables the vehicle ignition outside of the normal working hours of the driver with a restricted license, pleasure driving and the like is precluded.

The second embodiment 100 can also be incorporated with the system of FIG. 1. In this case, the CPU 24 determines if the license is restricted and, if so, enables the vehicle ignition only during the normal and authorized working hours of the driver.

Figure 4:
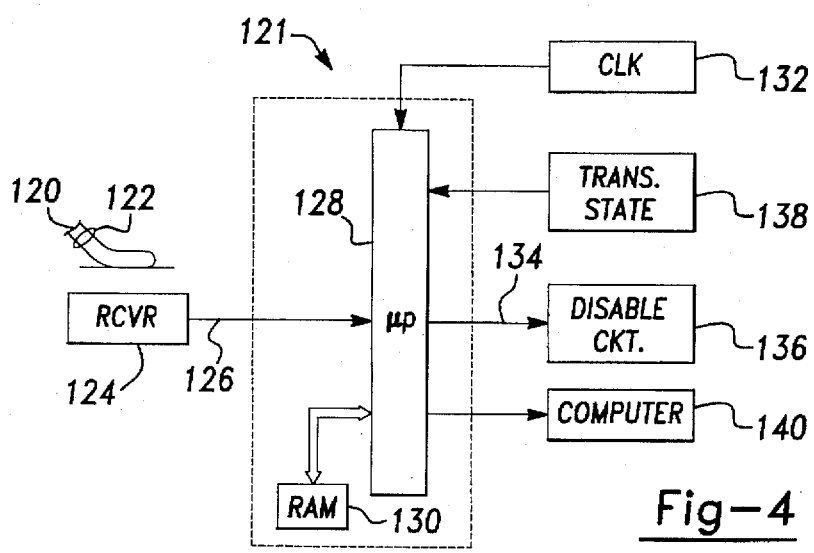
FIG. 4 is a block diagrammatic view illustrating a third preferred embodiment of the invention.

With reference now to FIG. 4, a third preferred embodiment 121 of the present invention is there shown in which a person 120 having a restricted drivers license is required to wear a radio transmitter 122. Such radio transmitters are commonly available today and are conventionally in the form of a bracelet which is fitted around the ankle of the person 120. The bracelet can only be removed by the authorities and is known as an "electronic tether system". This radio transmitter 122 generates a preset radio signal.

A radio receiver 124 for receiving the preset signal is contained within the motor vehicle and preferably under the floor mat on the driver's side of the motor vehicle. This radio receiver 124 receives the signal from the radio transmitter 122, when present, and generates an output signal on its output line 126 in response thereto.

Although the transmitter 122 may be a radio transmitter, alternatively it may comprise a passive tag which transmits or emits a preset signal when placed in a radiated field. Such tags are often based on the magnetic properties of the tag.

The system 121 includes a microprocessor 128 which receives the output signal on line 126 from the radio receiver 124. The microprocessor 128 also has access to random access memory 130 which contains a time schedule containing time periods during which operation of the vehicle by selective persons, i.e. those persons wearing the transmitter 122, is unauthorized. The microprocessor 128 also receives a time signal from a clock circuit 132 which is representative of the time of day.

The microprocessor 128, under control of the computer program, then compares the signal from the clock circuit 132 with the preset time schedule in the random access memory 130. If the time signal from the clock signal 132 falls within the preset time schedule in the random access memory 130, when coupled with an output signal on line 126 from the radio receiver 124, indicative that operation of the vehicle is unauthorized by the person 120, the microprocessor 128 generates an output signal line 134 to a disable circuit 136 which disables operation of the motor vehicle. Any conventional disable circuit 136, such as an ignition interrupt circuit, can be used.

In the preferred embodiment of the invention, the microprocessor 128 also receives a signal from a transmission circuit 138 indicative of whether the transmission is disengaged, i.e. in park or neutral, or engaged, i.e. in drive or reverse. In the event that the transmission is engaged, the microprocessor 128 prevents the transmission of a disabled signal on the line 134 to the disable circuit 136 to permit the continued operation of the vehicle until the transmission 138 is moved to its disengaged position. This safety feature prevents sudden disabling of the vehicle while the transmission is engaged.

The microprocessor 128 also preferably stores information containing the time periods of use of the vehicle in the random access memory 130. This information can be subsequently down loaded to a computer 140 as required by the appropriate authorities.

Figure 5:
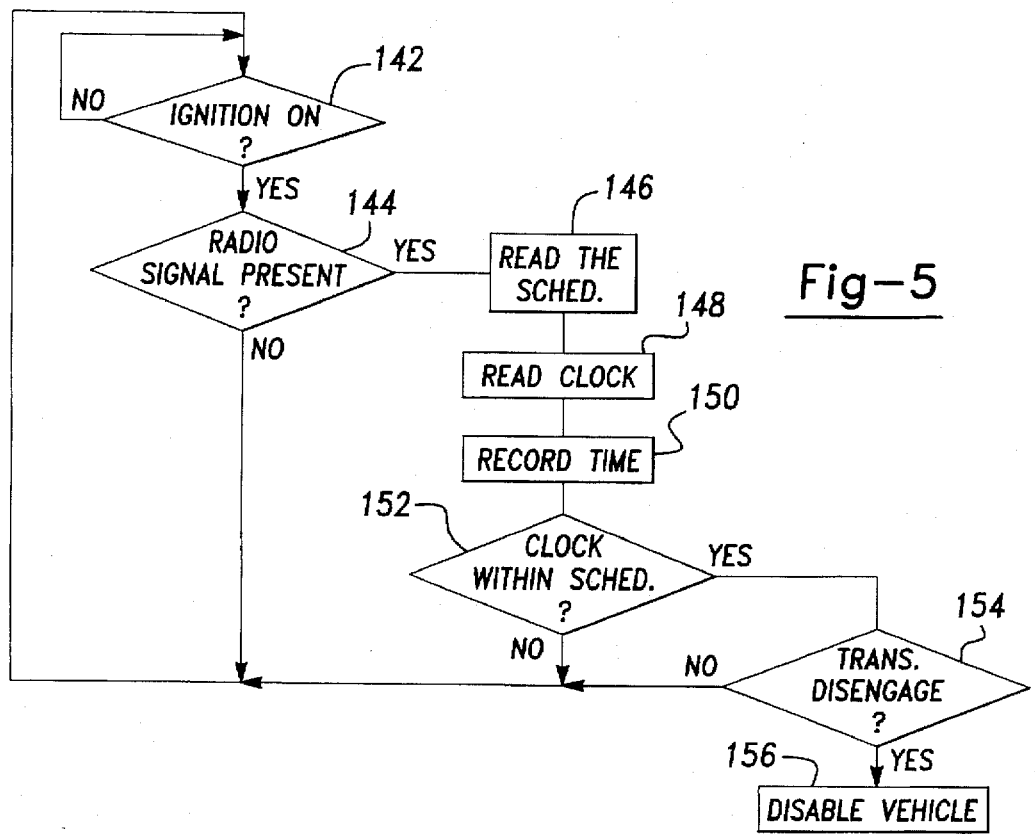
FIG. 5 is a flow chart illustrating the operation of the third preferred embodiment of the invention.

With reference now to FIG. 5, a flow chart illustrating the operation of the third preferred embodiment 121 of the present invention is there shown. At step 142, the system determines whether or not the ignition is on. If not, step 142 continuously reiterates.

Conversely, if the ignition is turned on, step 142 branches to step 144, which determines whether or not the signal from the radio transmitter 122 is present. If not, step 144 branches to step 142 thus allowing normal operation of the vehicle.

Conversely, assuming that the signal from the radio transmitter 122 is present, step 144 instead branches to step 146 in which the microprocessor 128 reads the time schedule from the random access memory. Step 146 then branches to step 148 which reads the time signal from the clock 132 and then to step 150 in which the time of operation of the vehicle is recorded in the random access memory 130. Step 150 then branches to step 152.

At step 152, the microprocessor 128 compares the time signal from the clock 132 with the time schedule from the random access memory 130 to determine if the time signal is within the preset time schedule. If not, indicative that operation of the vehicle is authorized, step 152 branches to step 142 and permits normal operation of the vehicle.

Conversely, if the time signal from the clock 132 is within the time schedule, indicative that use of the vehicle is unauthorized, step 152 instead branches to step 154 in which the microprocessor 128 determines if the transmission is engaged or disengaged. If engaged, step 154 branches to step 142 where operation of the vehicle is permitted. Conversely, if the transmission is disengaged, i.e. in either park or neutral, step 154 instead branches to step 156 in which the microprocessor 128 generates a signal on its output line 134 to the disable circuit to disable operation of the vehicle.

The primary advantage of the third preferred embodiment 121 of the present invention is that the vehicle is normally enabled so that the vehicle can be normally operated in its intended fashion. Conversely, the third embodiment 121 only disables the vehicle when it detects the presence of the transmitter 122 worn by the person with the restricted drivers license coupled with an attempt to utilize the vehicle during an authorized time period.

Figure 6:
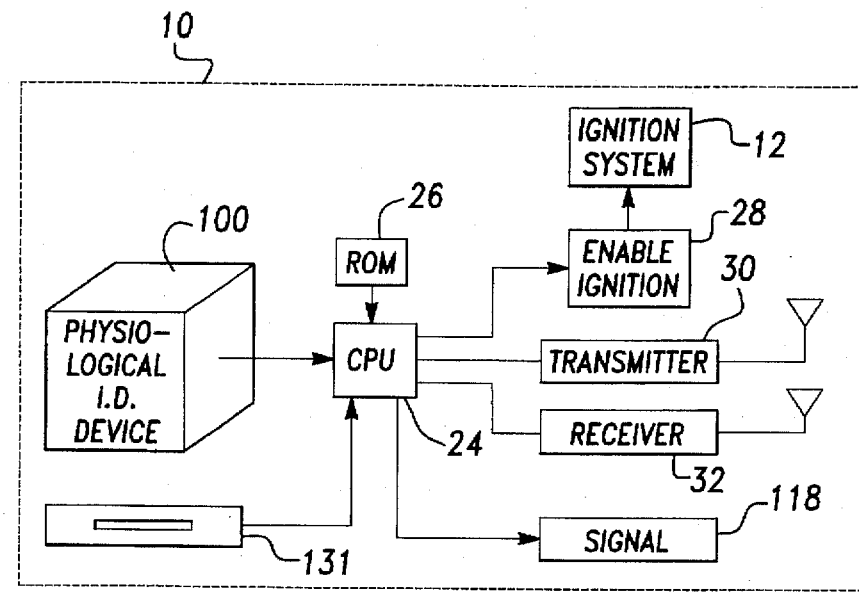
FIG. 6 is a block diagrammatic view illustrating a further embodiment of the invention.

With reference now to FIG. 6 a still further preferred embodiment of the present invention is there shown and comprises a physiological identification device 100, such as a fingerprint reader, retina scanner, iris scanner or the like. In the well known fashion, the physiological identification device 100 generates an output signal representative of the driver's scanned physiological part, e.g. fingerprint, eyeball, etc., as an input signal to the central processing unit 24.

The central processing unit 24 then compares the signal from the physiological identification device 100 to data representative of authorized drivers stored in the read only memory 26. If the central processing unit 24 detects a match between the signal from the physiological identification device 100 and the physiological identification data from an authorized driver stored in the memory 26, the central processing unit 24 generates a signal to the circuit means 28 to activate the vehicle ignition system 12 in the previously described fashion.

If the central processing unit 24 fails to match the signal from the physiological identification device 100, activation of the vehicle ignition system 12 is prevented. Alternatively, however, the previously described transmitter 30 and receiver 32 respectively transmit and receive signals with the central station 34 to determine if the driver has a valid driver license as has been previously described.

Since physiological identifications such as fingerprints and eyeballs are unique to individuals, this overriding of the invention completely precludes overriding the system with borrowed, stolen and/or fake driver's licenses.

In the preferred embodiment of the invention, the physiological identification device 100 is utilized to periodically check the authorization of the driver during the operation of the vehicle. This ensures that the vehicle cannot be initially started by an authorized driver and the vehicle then turned over to an unauthorized driver.

Figure 7:
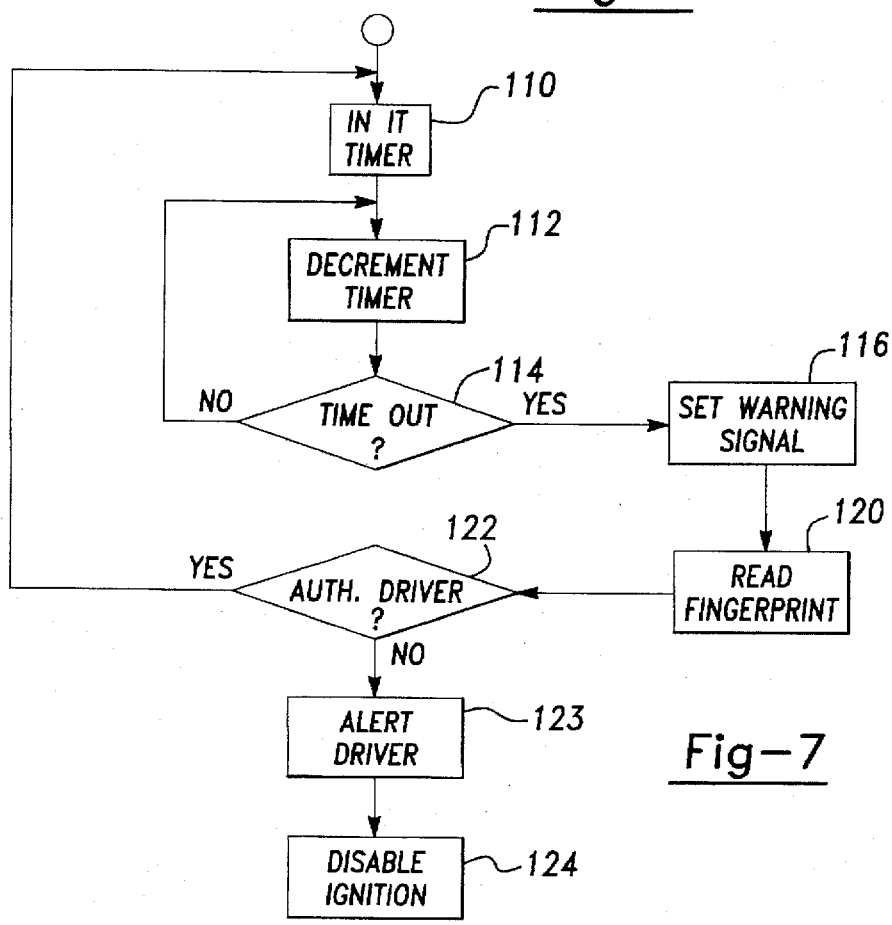
FIG. 7 is a flow chart illustrating the operation of a preferred embodiment of the invention.

With reference then to FIGS. 6 and 7, a program stored in the read only memory 26 and which controls the operation of the central processing unit 24 is there shown for periodically reverifying the authorization of the driver. At step 110, the program first initializes a software timer to a predetermined count indicative of a predetermined time period, e.g. fifteen minutes. The timer itself is a memory location or locations in random access memory accessible by the central processing unit 24. Step 110 then branches to step 112.

At step 112, the timer is decremented and then branches to step 114. At step 114, the program determines whether the timer has reached zero or timed out. If not, step 114 branches to step 112 whereupon the timer is again decremented and the above process is repeated.

Conversely, if the timer has timed out at step 114, indicative that the predetermined time period has elapsed, step 114 branches to step 116 at which time the central processing unit 24 activates a warning signal 118 (FIG. 6). The warning signal 118 may be either audio, visual or both and, once activated, requires that the driver again utilize the physiological identification device 100. Step 116 then branches to step 120.

At step 120, the central processing unit 24 receives the output signal from the physiological identification device 100 and then branches to step 122. At step 122, the central processing unit 24 compares the physiological identification read at step 120 with the authorized drivers in the previously described fashion. Assuming that the authorized driver is still operating the vehicle, step 122 branches back to step 110 which reinitializes the timer whereupon the above-identified process is repeated.

Conversely, if the physiological identification does not correspond to an authorized driver, step 122 instead branches to step 123 where the central processing unit 24 activates an alarm signal to warn the driver that the vehicle will be disabled after a predetermined time period, e.g. one minute, in order to allow the driver to safely halt the vehicle. After the predetermined time period, step 123 branches to step 124 whereupon the central processing unit 24 generates the appropriate output signals to the circuit means 28 to disable the ignition system of the vehicle.

As a further improvement to the invention, a card reader 131 may be used to read magnetic data on a driver license. This magnetic data includes physiological identification data representative of the licensed driver.

Consequently, before first starting the vehicle, the driver license is inserted into the card reader 131 which then reads and stores the physiological identification data. Thereafter, the driver is periodically prompted to use the physiological identification device 100 which compares the stored data with the output signal from the physiological identification device 100. If the two signals match, normal operation of the vehicle continues. Otherwise, the vehicle ignition is disabled in the above-identified fashion.

Having described my invention, however, many modifications thereto will become apparent to those skilled in the art to which is pertains without deviation from the spirit of the invention as defined by the scope of the appended claims.

I claim:

1. For use with an automotive vehicle having a normally disabled ignition system, a system for selectively enabling said ignition system comprising:

means for reading a person's preselect physiological identification member and for generating a physiological identification signal representative thereof, memory means for storing physiological identification data representative of authorized drivers for the vehicle, means for comparing said physiological identification signal with said stored physiological identification data in said memory means, means for enabling the vehicle ignition system when said physiological identification signal corresponds to said stored physiological identification data, a central station containing stored data representative of a plurality. of drivers' physiological identification data.

means in the vehicle responsive when said physiological identification signal does not correspond to said stored physiological identification data for transmitting a signal representative of the physiological identification signal to said central station.

means at said central station for receiving the physiological identification signal and for comparing the received signal with stored physiological identification data at the central station.

means responsive to said comparison at said central station for transmitting an output signal to said vehicle.

means at said vehicle for receiving said output signal from said central station and for enabling said ignition system in response thereto.

2. The invention as defined in claim 1 wherein said comparing means comprises a microprocessor.

3. The invention as defined in claim 1 wherein said transmitting means comprises a radio transmitter and said receiving means comprises a radio receiver.

4. The invention as defined in claim 1 and comprising means for determining if operation of the vehicle corresponding to said physiological identification signal is restricted to preset times of use and, if so, means for selectively enabling the vehicle ignition only during said preset time periods.

5. The invention as defined in claim 1 wherein said comparing means comprises means for periodically comparing said physiological identification signals with said stored physiological identification data during operation of the vehicle.

6. The invention as defined in claim 5 and comprising means for activating a signaling means prior to each activation of said periodic comparing means.

7. The invention as defined in claim 6 and comprising means responsive to a predetermined signal from said periodic comparing means for disabling the vehicle ignition system after a predetermined time period.

8. The invention as defined in claim 6 and comprising means for activating an alarm signal at the beginning of said predetermined time period.

9. The invention as defined in claim 5 and comprising a driver's license having data representative of a physiological identification of a driver, and means for reading and storing said driver license data as said stored physiological identification data.

10. The invention as defined in claim 1 wherein said physiological identification member is a fingerprint.

11. The invention as defined in claim 1 wherein said physiological identification member is an eyeball part.

12. For use with an automotive vehicle having a normally disabled ignition system, a system for selectively enabling said ignition system comprising:

means for reading a person's preselect physiological identification member and for generating a physiological identification signal representative thereof, memory means for storing physiological identification data representative of authorized drivers for the vehicle, means for comparing said physiological identification signal with said stored physiological identification data in said memory means, and means for enabling the vehicle ignition system when said physiological identification signal corresponds to said stored physiological identification data wherein said comparing means comprises means for periodically comparing said physiological identification signals with said stored physiological identification data during operation of the vehicle.

13. The invention as defined in claim 12 wherein said comparing means comprises a microprocessor.

14. The invention as defined in claim 12 and comprising means for determining if operation of the vehicle corresponding to said physiological identification signal is restricted to preset times of use and, if so, means for selectively enabling the vehicle ignition system only during said preset time periods.

15. The invention as defined in claim 12 and comprising means for activating a signaling means prior to each activation of said periodic comparing means.

16. The invention as defined in claim 15 and comprising means responsive to a predetermined signal from said periodic comparing means for disabling the vehicle ignition system after a predetermined time period.

17. The invention as defined in claim 16 and comprising means for activating an alarm signal at the beginning of said predetermined time period.

18. The invention as defined in claim 12 and comprising a driver's license having data representative of a physiological identification of a driver, and means for reading and storing said driver license data as said stored physiological identification data.

19. The invention as defined in claim 12 wherein said physiological identification member is a fingerprint.

20. The invention as defined in claim 12 wherein said physiological identification member is an eyeball part.

21. For use with an automotive vehicle having a normally disabled ignition system, a system for selectively enabling said ignition system comprising:

means for reading a person's preselect physiological identification member and for generating a physiological identification signal representative thereof, memory means for storing physiological identification data representative of authorized drivers for the vehicle, means for comparing said physiological identification signal with said stored physiological identification data in said memory means, and means for enabling the vehicle ignition system when said physiological identification signal corresponds to said stored physiological identification data, and means for determining if said physiological identification signal is restricted to preset times of use and, if so, means for selectively enabling the vehicle ignition only during said preset time periods.

22. The invention as defined in claim 21 wherein said comparing means comprises a microprocessor.

23. The invention as defined in claim 21 wherein said comparing means comprises means for periodically comparing said physiological identification signals with said stored physiological identification data during operation of the vehicle and means for activating a signaling means prior to each activation of said periodic comparing means.

24. The invention as defined in claim 23 and comprising means responsive to a predetermined signal from said periodic comparing means for disabling the vehicle ignition system after a predetermined time period.

25. The invention as defined in claim 23 and comprising means for activating an alarm signal at the beginning of said predetermined time period.

26. The invention as defined in claim 23 and comprising a driver's license having data representative of a physiological identification of a driver, and means for reading and storing said driver license data as said stored physiological identification data.

27. The invention as defined in claim 21 wherein said physiological identification member is a fingerprint.

28. The invention as defined in claim 21 wherein said physiological identification member is an eyeball part.

* * * * *